May 17, 1960  G. W. HEISELER  2,936,625
SELF-TIGHTENING GRIPPING DEVICE
Filed May 8, 1957
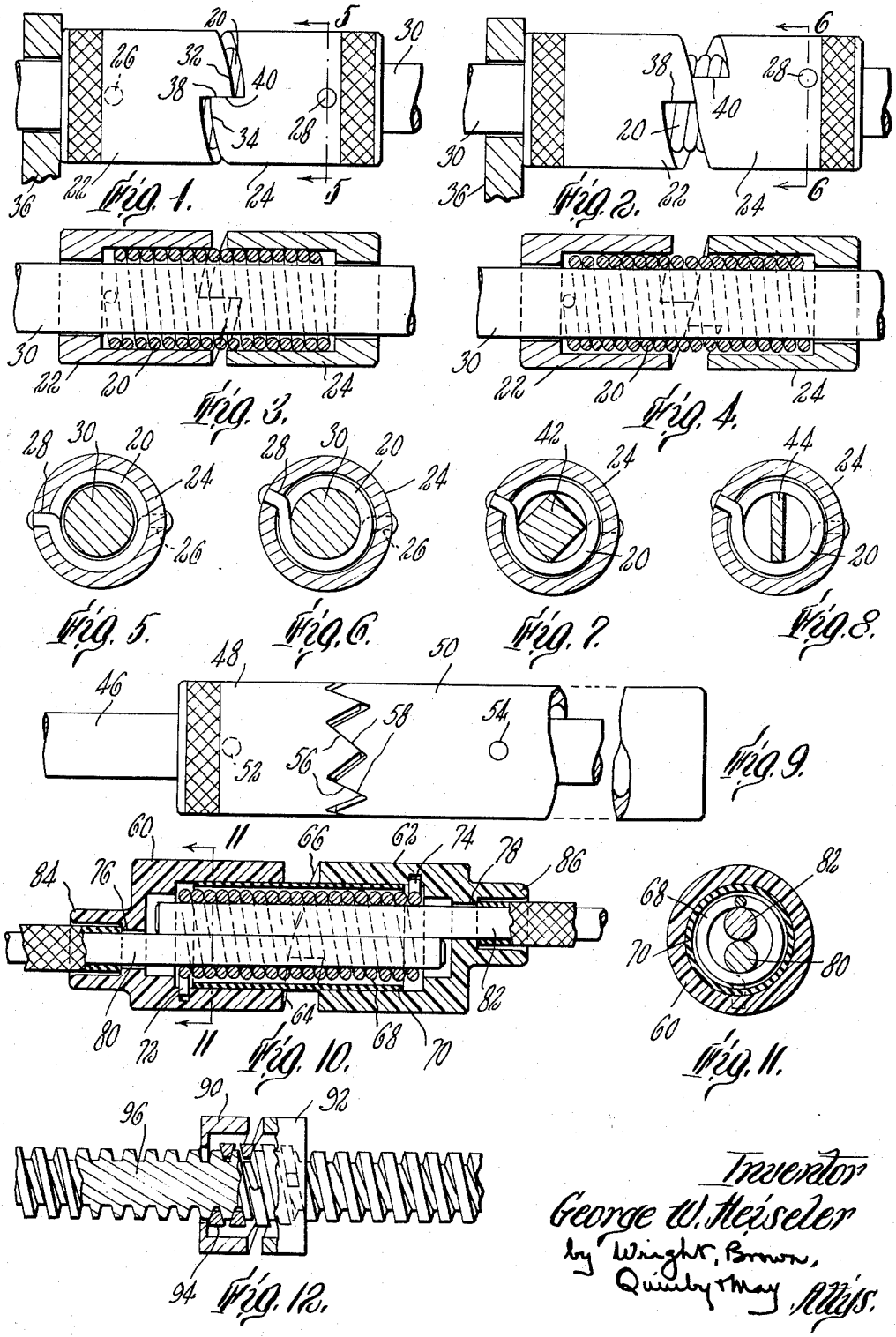
Inventor
George W. Heiseler
by Wright, Brown,
Quinby & May Attys.

United States Patent Office 2,936,625
Patented May 17, 1960

2,936,625
SELF-TIGHTENING GRIPPING DEVICE

George W. Heiseler, Saugus, Mass.

Application May 8, 1957, Serial No. 657,977

4 Claims. (Cl. 74—1)

This invention relates to a self-tightening gripping device adapted to be mounted and adjusted on an elongated member such as a rod or strand or a plurality of rods or strands and to be readily adjusted thereon or removed therefrom. The device can be used in a variety of ways. For example it may be mounted on a rod or cable as a stop member. It may be used as a nut on a bolt. It may be used as a part of an adjustable extension on a leg of a ladder or other equivalent member. It can be used, if made of the proper materials, as an insulated electric connector to join the ends of two wires.

As hereinafter described, the device consists essentially of a helical coil of wire, the ends of which are respectively attached to two tubular members having opposed cam edges which when pressed together tend to cause relative rotation of the members in a direction to tighten the coil and reduce its interior diameter. If the device has been mounted on an elongated object or bundle of objects on which the coil substantially fits, the reduction of the interior diameter of the coil will cause it to grip the object or objects when the two tubular members are pushed toward each other.

For a more complete understanding of the invention, reference may be had to the following description thereof and to the drawing, of which—

Figure 1 is an elevational view of an embodiment of the invention in an inoperative position;

Figure 2 is a similar view of the same in an operative position;

Figure 3 is a longitudinal section of the device as shown in Figure 1;

Figure 4 is a longitudinal section of the device as shown in Figure 2;

Figure 5 is a section on the line 5—5 of Figure 1;

Figure 6 is a section on the line 6—6 of Figure 2;

Figure 7 is a transverse section of the device on a square rod;

Figure 8 is a transverse section of the device on a strip;

Figure 9 is an elevational view of a modified form of the invention;

Figure 10 is a sectional view of another modified form of the invention;

Figure 11 is a section on the line 11—11 of Figure 10; and

Figure 12 is an elevation of another modified form partly broken away to show in section.

One form of the invention is illustrated in Figures 1 to 6 of the drawing, and consists essentially of a helically coiled spring 20 enclosed in two tubular members 22 and 24. The ends of the wire coil are caught on the respective members by being toed into holes 26 and 28 through the walls of the members and may, if desired, be peened or otherwise secured to maintain the coil and members in assembled relation. Since the ends of the coil are attached respectively to the members 22 and 24, relative rotation of the members in one direction or the other results in a decrease or increase in the diameter of the coil 20. The device is intended to be fitted on an elongated member such as a rod 30, and the coil 20 is preferably made of such a size that it will hug the rod 30 when mounted theron, the inner diameter of the coil 20, when the coil is unstressed, being slightly less than the diameter of the rod 30.

According to the invention the opposing end edges of the two members 22 and 24 have cam portions 32 and 34, respectively which are inclined with respect to a transverse plane and are in mutual engagement, as in Figure 2, when the device is in its operative position. When in this position any relative movement of the members toward each other results in relative rotation. The cam edges are so shaped with respect to the coil 20 that such relative rotation of the members tightens the coil and thus increases its grip on the rod or stand 30. Thus, for example, the device may be used as an adjustable stop on the rod 30 which passes through a hole in a bracket 36. If as in Figure 2 there is tension on the rod toward the left, the member 24 is pulled toward the member 22 which is against the bracket 36. This tends to cause a slight relative rotation of the members in a direction to tighten the coil 20 on the rod 30. To facilitate adjustment of the device on the rod, the opposing ends of the members 22 and 24 may be provided with inter-engageable shoulders 38 and 40. These shoulders are so arranged with reference to the spring 20 that when the members 22 and 24 are reversely turned to the relative angular posiitons indicated in Figure 1 which enables the shoulders 38 and 40 to engage each other, the coil 20 is thereby expanded sufficiently to fit loosely on the rod 30. The device can then be easily slid along the rod to any desired position of adjustment. If the members 22 and 24 are then pulled away from each other to move the shoulders 38 and 40 clear of each other, the spring coil 20 rotates the members relatively to the positions shown in Figure 2, and the coil 20 grips the rod 30.

The elongated member on which the device is mounted need not be a cylindrical rod but can have other forms such, for example, as the squared rod 42 shown in Figure 7 or the flat strip 44 shown in Figure 8.

Figure 9 illustrates a modified form of the invention which is capable of various uses where a member of adjustable length is desired. For example, the rod 46 may represent the lower portion of the leg of a ladder. This rod telescopes into a device consisting of a short tubular member 48 and a long tubular member 50 which may be closed at its remote end to serve as a foot of the ladder. A coiled wire spring (not shown) similar to the spring 20 is enclosed by the member 48 and the adjacent portion of the member 50, the ends of the coil being attached to the respective members as at 52 and 54. The opposing ends of the members may be shaped like the ends of the members 22 and 24 or, as shown, may be serrated to provide a number of inclined cam edges 56 and 58 arranged to cause relative rotation of the members 48 and 50 in a direction to tighten the spring coil therein when the members are pressed toward each other.

The device can be used on a plurality of elongated objects such as a bundle of wires if the dimensions are properly chosen. Figures 10 and 11 show a device thus used to connect two electric wires. For this purpose the tubular members 60 and 62 of the device are preferably of strong insulating material. The opposing ends 64 and 66 may be shaped like the ends 32 and 34 in Figures 1 and 2. A spring coil 68 similar to the spring coil 20 is enclosed in the members 60 and 62 and a thin lining tube 70 of insulation may be loosely inserted between the coil 68 and the members 60 and 62 so that the coil will not be exposed through the gap between the ends 64 and 66. The ends of the spring coil 68 are attached to the respective members 60 and 62 as at 72 and 74. The mutually remote ends of the members have offset openings 76 and 78 to receive the stripped end portions of insulated electric wires 80 and 82. These openings are surrounded by flanges 84 and 86 to receive insulated portions of the wires 80 and 82 so that the connection is completely insulated and no metal part is exposed. By means of this form of the device, two electric wires can be quickly and securely connected, the coil 68 serving both as a conductor and as a gripping element.

The invention may also be embodied in a device which serves as a nut on a screw-threaded shank or bolt, as illustrated in Figure 12. The nut comprises two short tubular members 90 and 92 enclosing a spring coil 94 which may be of wire with a circular cross-section or specially shaped, as shown, to fit in the valleys of the screw thread of a shank 96. The ends of the coil are attached to the respective members and the opposing ends of the members are either serrated (as in Figure 9) or shaped as in Figure 1 to present cam edge portions for mutual contact as hereinbefore described. In some cases it is possible to design the nut so that the members 90 and 92 can be reversely turned sufficiently to cause the coil 94 to clear the ridge of the thread on the shank 96. The nuts can then be quickly shifted along the shank any desired distance without the slow and laborious turning required by a common nut. When left to itself, the device grips the shank and the grip is intensified by axial pressure on the device, as hereinbefore explained. The device thus serves as an effective lock-nut which can quickly and easily be located where desired on a threaded member, or removed therefrom.

I claim:

1. A gripping device consisting of a helical spring coil and two coaxial tubular members arranged end to end on and substantially enclosing said coil, each end of said coil being attached to one of said members, whereby relative rotation of said members in one direction or the other decreases or increases the inner diameter of the coil, said members having opposing ends with shoulders which are mutually engageable when the members are relatively turned to increase said inner diameter of the coil, whereby the increase in the inner diameter is maintained until said shoulders are disengaged.

2. A self-tightening gripping device for use on an elongated member such as a rod or strand, consisting of a helical spring coil having when unstressed an interior diameter approximately equal to the diameter of the elongated member, and two coaxial sleeves arranged end to end on and together surrounding and enclosing said coil, the ends of said spring being caught on respective said sleeves, said sleeves having mutually opposed end edges with inclined portions tending to cause relative rotation of said sleeves in a direction to reduce the interior diameter of said coil in response to relative axial movement of the sleeves toward each other.

3. A self-tightening gripping device for use on an elongated member such as a rod or strand, consisting of a helical spring coil having when unstressed an interior diameter slightly less than the diameter of said elongated member, and two coaxial sleeves arranged end to end on and together surrounding and enclosing said coil, each of said sleeves having an end of said coil caught thereon, said sleeves having mutually opposed end edges with mutually engageable cam surfaces tending when pressed together to cause relative rotation of the sleeves to contract the coil therein, said end edges also having shoulders which are mutually engageable when the sleeves are relatively turned against the tension of the coil to expand the coil to an inner diameter greater than the diameter of said elongated member.

4. A gripping device consisting of a helical spring coil and two coaxial tubular members arranged on end to end on and substantially enclosing said coil, each end of said coil being attached to one of said members, whereby relative rotation of said members in one direction or the other decreases or increases the inner diameter of the coil, said members having opposing ends with inclined cam edges which are normally mutually engaged and tend to turn said members relatively in a direction to decrease the inner diameter of the coil in response to axial pressure on said members toward each other, said ends also having shoulders which are mutually engageable when the members are relatively turned to increase said inner diameter of the coil, whereby the increase in the inner diameter is maintained until said shoulders are disengaged.

References Cited in the file of this patent
UNITED STATES PATENTS

| | | |
|---|---|---|
| 1,003,973 | Barrickman | Sept. 26, 1911 |
| 1,167,296 | Hallowell | Jan. 4, 1916 |
| 1,179,332 | Lundholm | Apr. 11, 1916 |
| 1,446,144 | Adams | Feb. 20, 1923 |
| 1,630,958 | Mauch | May 31, 1927 |
| 2,105,330 | Pagenkopf | Jan. 11, 1938 |
| 2,233,539 | Landrum | Mar. 4, 1941 |
| 2,559,895 | Norlander | July 10, 1951 |
| 2,604,135 | Ryberg | July 22, 1952 |
| 2,818,253 | Zito | Dec. 31, 1957 |